United States Patent
Li et al.

(10) Patent No.: US 11,905,352 B2
(45) Date of Patent: Feb. 20, 2024

(54) EXPANSIVE POLYMER GROUTING MATERIAL FOR TREATING HIGH-PRESSURE LARGE-FLOW-RATE KARST WATER INRUSH AND PREPARATION METHOD THEREOF

(71) Applicant: SHANDONG UNIVERSITY, Shandong (CN)

(72) Inventors: Shucai Li, Jinan (CN); Rentai Liu, Jinan (CN); Chenyang Ma, Jinan (CN); Mengjun Chen, Jinan (CN); Yankai Liu, Jinan (CN); Zhenjun Wang, Jinan (CN); Chunyu Zhang, Jinan (CN); Xiuhao Li, Jinan (CN); Shaolong Duan, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 517 days.

(21) Appl. No.: 17/275,998

(22) PCT Filed: Oct. 18, 2019

(86) PCT No.: PCT/CN2019/112042
§ 371 (c)(1),
(2) Date: Mar. 12, 2021

(87) PCT Pub. No.: WO2020/103621
PCT Pub. Date: May 28, 2020

(65) Prior Publication Data
US 2022/0064347 A1  Mar. 3, 2022

(30) Foreign Application Priority Data

Nov. 19, 2018 (CN) .......................... 201811378133.7

(51) Int. Cl.
*C08F 220/06* (2006.01)
*C08K 3/36* (2006.01)
*E21D 11/38* (2006.01)

(52) U.S. Cl.
CPC .............. *C08F 220/06* (2013.01); *C08K 3/36* (2013.01); *E21D 11/38* (2013.01)

(58) Field of Classification Search
CPC .. C08F 220/06; C08F 283/06; C08F 222/385; C08K 3/36; E21D 11/38
See application file for complete search history.

(56) References Cited

FOREIGN PATENT DOCUMENTS

| CN | 101844902 A | 9/2010 |
| CN | 102134391 A | 7/2011 |
| CN | 104262544 A | 1/2015 |
| CN | 106243275 A | 12/2016 |
| CN | 106279494 A | * 1/2017 | ............ C08F 120/06 |
| CN | 106279494 A | 1/2017 |
| CN | 107200806 A | 9/2017 |
| CN | 107963841 A | 4/2018 |
| CN | 108299599 A | 7/2018 |
| CN | 109535306 A | 3/2019 |
| KR | 100682823 B1 | 2/2007 |

OTHER PUBLICATIONS

Jan. 17, 2020 International Search Report issued in International Patent Application No. PCT/CN2019/112042.
Jan. 17, 2020 Written Opinion issued in International Patent Application No. PCT/CN2019/112042.
Apr. 28, 2019 Office Action issued in Chinese Patent Application No. 201811378133.7.

* cited by examiner

*Primary Examiner* — Peter A Salamon
(74) *Attorney, Agent, or Firm* — Oliff PLC

(57) ABSTRACT

A preparation method of an expansive polymer grouting material for treating high-pressure large-flow-rate karst water inrush includes: 1) adding a crosslinking agent to acrylic acid; then adding a polymer water-absorbent resin comonomer and performing a polymerization reaction to obtain a precursor; 2) adding an initiator to the precursor obtained in step 1), heating the mixture, performing a reaction to obtain a hydrogel, and grinding the hydrogel to obtain a primary polymer water-absorbent resin; 3) spraying a surface crosslinking agent onto a surface of the primary polymer water-absorbent resin obtained in step 2), and drying the product; and 4) preparing a suspension from an inorganic water conducting agent, spraying the suspension onto the product obtained in step 3), and performing drying to obtain the expansive polymer grouting material.

21 Claims, 3 Drawing Sheets

EXPANSIVE POLYMER GROUTING MATERIAL FOR TREATING HIGH-PRESSURE LARGE-FLOW-RATE KARST WATER INRUSH AND PREPARATION METHOD THEREOF

BACKGROUND

Technical Field

The present invention belongs to the technical field of underground engineering blocking materials, and in particular relates to an expansive polymer grouting material for blocking high-pressure large-flow-rate karst water inrush and a preparation method thereof.

Related Art

Water inrush is one of the main geological hazards in underground engineering. China's underground engineering construction has received more and more attention, and the geological conditions faced have become gradually complicated. In the construction process of underground engineering, it is very easy to encounter bad adverse geological structures such as water-rich faults, and geological hazards such as landslides, water inrush and large deformation of surrounding rock are prone to occur. Especially in the area of the water-rich fracture zone, the surrounding rock is relatively fractured, and the water inflow is large.

Practice shows that grouting is an effective technical means to treat water inrush. For example, Chinese Patent No. 201610770793.4 discloses an environment-friendly elastic acrylate grouting material and a use method thereof. The environment-friendly elastic acrylate grouting material includes a component A: an acrylate, a crosslinking agent I, a crosslinking agent II, and an accelerator; and a component B: water and an initiator. The environment-friendly elastic acrylate grouting material has the advantages of low grouting viscosity, consolidated material elongation of up to 200% or above, environment friendliness and the like, and can be used for anti-seepage and plugging of long-term expansion and movement seams in a water environment. However, although the grouting material has the advantages of environment friendliness and no toxicity and is suitable for anti-seepage and plugging of expansion seams, it is not suitable for operation under a high-pressure large-flow-rate water flow, because it is easily diluted and is difficult to gel and the form of the two-component grouting material limits its use and development.

Chinese patent No. 201711475087.8 discloses an acrylate aqueous solution grouting material and a preparation method thereof. The grouting material includes: a component A: an acrylate aqueous solution, a crosslinking agent and an accelerator; and a component B: water, an aqueous polymer emulsion and an initiator. The acrylate aqueous solution grouting material has the characteristics of low grouting viscosity, high strength and low shrinkage in a dry environment, and significantly reduces the risk of blocking. However, this acrylate grouting material is mainly used to control seepage of sewer water and stabilize and solidify loose soil, and is not suitable for blocking high-pressure large-flow-rate water inrush, because the component B is easily diluted under the scouring of flowing water and cannot make the component A gel and the form of the two-component grouting material limits its use in gushing water blocking.

Chinese patent No. 201010172263.2 discloses a quick-setting high-strength expansive mine plugging material, which is prepared from raw materials: high-alumina cement, citric acid, lime, gypsum and sodium lauryl sulfate. The material can be quickly set under the condition of high water-to-cement ratio, its volume expands in the setting process (the 1-day maximum free expansion rate can reach 10% or above), and the consolidated body has a higher strength (the 1-day strength is up to 3-4 MPa). However, the quick-setting high-strength expansive mine plugging material is an inorganic chemical material, and is mainly used to reinforce the surrounding rock of the mine and block the grouting hole. It has a certain expansion effect, but the expansion rate is only 10%, so it cannot realize blocking treatment for water inrush of the karst conduit and fracture zone.

Chinese patent No. 201110007241.5 discloses a polymer reinforcing and water-blocking grouting material for underground engineering and a construction technique thereof. The grouting material is composed of two low-viscosity liquid components, a resin and a catalyst, which can react to generate inert foam, so the grouting material has a very high expansion rate. However, this polymer reinforcing and water-blocking grouting material is a polyurethane grouting material, and is obtained by a reaction between polyether polyol and polyisocyanate. It can foam and expand, and is suitable for coal and rock mass reinforcement, crack filling and leakage water prevention. But the polymer reinforcing and water-blocking grouting material is easily diluted under the condition of large-flow-rate water inrush to form a strip-shaped gel along the advance direction of the water flow, which is carried to the depths of the formation, so it does not have the effect of blocking water inrush.

Chinese patent No. 201711162326.4 discloses an expansive soft rock roadway grouting material. The grouting material is composed of a base component and a doping component. The base component includes ultrafine cement, fly ash and silica fume, and the doping component includes a superplasticizer and a graphite powder stabilizer. The grout prepared from the grouting material has good fluidity and stability, high early and long-term strength, good impermeability and good durability, can inhibit the deformation of the surrounding rock caused by water swelling in the expansive soft rock roadway grouting process and avoid the closing of surrounding rock fissures caused by the grout injection, and can significantly improve the injectability and the water-blocking and reinforcing performance of the surrounding rock fissures in the expansive soft rock roadway after application. However, the grouting material is an inorganic chemical material, and is mainly composed of cement and fly ash. It is used to improve the injectability and the water-blocking and reinforcing performance of the surrounding rock fissures in the expansive soft rock roadway and mainly solve the engineering problem of leakage water hazards caused by surrounding rock fissures, and is not suitable for the geological hazard of high-pressure large-flow-rate water inrush in the karst conduit.

In addition, for the water inrush hazard in the tunnel and coal mine excavation process, it involves not only the problem of how to block the water inrush, but also the problems about environment friendliness, blocking effect, blocking manner and the like of the blocking material. Under the working condition of large-fissure water inrush, although cement-based grouting materials are cheap and environmentally friendly and have the effect of reinforcing fault fracture zones, such materials have longer initial and final setting time and poor water scouring resistance, and are easily scoured in the water-rich formations. Therefore, such materials have a low retention rate in the formation during gushing water blocking, and a few tons of cement consumed per meter still cannot meet the standard for ending the blocking, so the grouting blocking effect is not ideal. Common chemical grouting materials, such as polyurethane grouting materials, have the advantage of controllable gelation time, but under the scouring of flowing water, they can easily form a linear consolidated body along the water flow and be washed out by water. Therefore, in view of the water inrush hazards in the tunnel and coal mine excavation process, it is urgent to develop a green chemical grouting material with controllable gelation time, high water blocking capacity and expansibility.

SUMMARY

In view of the above problems in the prior art, the present invention aims to provide an expansive polymer grouting material for treating high-pressure large-flow-rate karst water inrush and a preparation method thereof. After absorbing water and swelling, the polymer grouting material of the present invention can be effectively stuck between the rock blocks of the water-rich fracture zone and continuously accumulate, so that the viscous force of water in the fissures is increased, the discharge area of the water-rich fracture zone is reduced, the flow rate of the gushing water is effectively reduced, and water inrush treatment of the water-rich fracture zone is realized. The polymer grouting material of the present invention effectively solves the technical problems that the grouting material is difficult to stay under the condition of gushing water. At the same time, the grouting water-blocking material of the present invention is green and pollution-free, and has an adjustable expansion time of 1-60 minutes and an expansion rate of up to 101-304 times.

A first objective of the present invention is to provide a preparation method of an expansive polymer grouting material for treating high-pressure large-flow-rate karst water inrush.

A second objective of the present invention is to provide an expansive polymer grouting material prepared by the above method.

A third objective of the present invention is to provide an expansive polymer grouting material composition prepared by the above method.

A fourth objective of the present invention is to provide application of the preparation method of the expansive polymer grouting material, the product prepared by the method and the composition of the product mentioned above.

To achieve the above objectives, specifically, the following technical solutions are disclosed in the present invention:

Firstly, the present invention discloses a preparation method of an expansive polymer grouting material for treating high-pressure large-flow-rate karst water inrush, including the following steps:

(1) A crosslinking agent is added to acrylic acid; and then a polymer water-absorbent resin comonomer is added and a polymerization reaction is performed to obtain a precursor. The polymer water-absorbent resin comonomer can be grafted to the surface of the acrylic acid monomer through the polymerization reaction to further increase the water absorptivity of the acrylic acid monomer and enhance the blocking performance of the grouting material. In addition, the synthesis method of the precursor adopted by the present invention is a static solution polymerization method. In this method, a solution is prepared from the polymerizable monomer and additives such as the crosslinking agent, and then the reaction is performed at a certain temperature, so the method is simple to operate and low in cost.

(2) An initiator is added to the precursor obtained in step (1), the mixture is heated, and a reaction is performed to obtain a hydrogel, and the hydrogel is ground to obtain a primary polymer water-absorbent resin.

(3) A surface crosslinking agent is sprayed onto a surface of the primary polymer water-absorbent resin obtained in step (2), and the product is dried for later use. Spraying the surface crosslinking agent on the surface can effectively control the degree of crosslinking of the surface of the primary polymer water-absorbent resin, so that the primary polymer water-absorbent resin has the characteristics of delayed expansion and high gel strength.

(4) A suspension is prepared from an inorganic water conducting agent, the suspension is sprayed onto the dried product of step (3), and drying is performed to obtain the granular expansive polymer grouting material.

In step (1), a mass concentration of the acrylic acid is 25-45%. The test shows that as the monomer concentration increases, the water absorption rate of the polymer water-absorbent resin decreases to different degrees. When the monomer concentration is lower than 25%, it is difficult to polymerize to form a gel, and the water absorption rate of the super absorbent resin cannot be accurately measured due to the existence of excessive water-soluble substances. In addition, deionized water may be used to dilute the acrylic acid to a set concentration, which is convenient and avoids introduction of impurities.

In step (1), the polymer water-absorbent resin comonomer includes polyvinyl alcohol, acrylamide, methacrylamide or acrylonitrile. These resin super absorbent resins have rich raw materials and low price, and have the characteristics of corrosion resistance and mildew resistance, long-term storage and excellent comprehensive water absorptivity. However, it does not exclude the starch and cellulose polymer water-absorbent resins as the raw material of the ultrahigh expansive grouting water-blocking material, for example: starch, hydroxyethyl cellulose, methyl cellulose or carboxymethyl cellulose as the polymer water-absorbent resin comonomer.

In step (1), the polymer water-absorbent resin comonomer is added in a proportion of 0.5-20% by mass of the acrylic acid in step (1). In the present invention, the polymer water-absorbent resin comonomer mainly plays a role in further enhancing the water absorptivity of the grouting material, and its addition amount should be controlled at 0.5-20%. If the addition amount is too small, the effect is not obvious, but an additional procedure is added, which increases the complexity of the process. If the addition amount is too large, it is not conducive to the control of the expansion time and expansion rate of the grouting material.

In step (1), the crosslinking agent is added in a proportion of 0.5-2% by mass of the acrylic acid in step (1). The type and degree of crosslinking of the crosslinking agent have a great influence on the water absorption rate of the super absorbent resin. The water absorption capacity of the resin decreases with the increase of the degree of crosslinking. From the perspective of increasing the water absorption rate of the water-absorbent resin, under the premise of ensuring that the water-absorbent resin is not dissolved, the degree of cross-linking should be reduced as much as possible. However, the resin after absorbing water shows the elastic behavior of rubber, and its gel strength is directly proportional to the degree of crosslinking, so reducing the degree of crosslinking will cause the gel strength to decrease. In the rock mass fracture zone grouting treatment process, in order to ensure that the polymer water-absorbent resin can be effectively stuck in the formation and not washed out by the water flow, the polymer water-absorbent resin must have a suitable degree of crosslinking, and the water absorption rate must be increased as much as possible while a certain gel strength is ensured. Therefore, the amount of the crosslinking agent is controlled at 0.5%-1.2% in the present invention.

In step (1), the crosslinking agent includes one or a combination of more of N,N-methylenebisacrylamide, dipentaerythritol hexaacrylate, pentaerythritol tetraester, pentaerythritol triallyl ether, pentaerythritol triacrylate, polyethylene glycol diglycidyl ether, ethoxylated glycerol triacrylate and ethylene glycol dimethacrylate.

In step (1), the time of the polymerization reaction is 1-1.5 h.

In step (2), the initiator is added in a proportion of 0.1-0.7% by mass of the acrylic acid in step (1). When the amount of the initiator is too large, the free radicals decomposed increase and the polymerization rate increases, resulting in an increase in crosslinking density, a decrease in relative molecular weight and a decrease in water absorption rate.

In step (2), the initiator includes: an inorganic peroxide initiator, an azo initiator and redox initiators.

Further, the inorganic peroxide initiator includes potassium persulfate, sodium persulfate and ammonium persulfate. The azo initiator includes azobisisobutyronitrile, azobisisoheptonitrile, dimethyl azobisisobutyrate and the like. The redox initiators include ammonium persulfate/sodium bisulfite, hydrogen peroxide/ferrous sulfate, ammonium persulfate/ferrous sulfate, potassium persulfate/ferrous chloride and the like. In the redox initiators, ammonium persulfate/sodium bisulfite, hydrogen peroxide/ferrous sulfate, ammonium persulfate/ferrous sulfate, potassium persulfate/ferrous chloride, and hydrogen peroxide/ferrous sulfate, the substance before "/" indicates an oxidation initiator, the substance after "/" indicates a reduction initiator, and each couple of redox initiators are used at the same time. A mass ratio of the oxidation initiator to the reduction initiator is 1:3-8. The initiator may directly affect the smooth progress of the polymerization reaction process and may also affect the polymerization reaction rate and the storage period of the product.

Further, in step (2), the heating means: gradually increasing the reaction temperature from 0 to 85° C., and the initiator is a combination of an inorganic peroxide initiator, an azo initiator and redox initiators. A mass ratio of the inorganic peroxide initiator to the azo initiator to the redox initiators is 1-5:1-5:1-7.

Using the above three different types of initiators at the same time can more effectively initiate the polymerization reaction, because the inorganic peroxide initiator and the azo initiator are both thermally decomposing initiators, and at a certain temperature, the compound thermally decomposes into free radicals, which are used to initiate the free radical polymerization of alkene and diene monomers. The inorganic peroxide initiator requires a higher temperature, about 65° C. or above, to initiate the polymerization reaction. The azo initiator requires a temperature of 50-65° C. to initiate the polymerization reaction. The redox initiator system uses the free radicals generated by electron transfer between the oxidant and the reducer to initiate the polymerization reaction, and can initiate the polymerization reaction at a lower temperature than the thermally decomposing initiator. Therefore, after the three different types of initiators are selected and combined in the present invention, at the early stage of the reaction, the reaction temperature is low and the precursor can initiate the polymerization reaction under the action of the redox initiators. As the temperature keeps rising, the azo initiator thermally decomposes and starts to participate in the reaction. When the temperature rises to 65° C. or above, the inorganic peroxide initiator also starts to participate in the reaction. In addition, for the binary copolymerization reaction initiated by the thermal initiator, if the reaction temperature is too low, the reaction rate is low, the ratio of the precursor converted into effective crosslinked structures is low within a certain period of time, some polymers appear water-soluble, and the water absorption capacity of the copolymer is low. However, if the reaction temperature is too high, the reaction is too violent, so that the molecular chain between the crosslinked structures of the product becomes shorter, the polymer chain cannot fully expand to absorb more water. As the reaction temperature rises, the degree of thermal crosslinking increases, and the water absorption capacity of the super absorbent resin decreases. Therefore, when the initiator is a thermally decomposing initiator, it is recommended to select the reaction temperature of 65-85° C., which can match the reaction characteristics of the three types of initiators, so that the reaction rate is effectively increased and the production energy consumption is reduced.

In step (3), the surface crosslinking agent includes one or a combination of more of water, polyol, glycidyl ether, ethylene carbonate, propylene carbonate and polyvalent metal compound.

Further, the polyol includes ethylene glycol, propylene glycol or glycerol, and the polyvalent metal compound includes silver nitrate and cupric chloride. After the primary polymer water-absorbent resin is surface-treated, the degree of crosslinking inside the resin granules is lower, and the degree of crosslinking of the surface is higher. Therefore, the polymer water-absorbent resin has the following advantages: I, the lower degree of crosslinking inside the polymer water-absorbent resin gives a good water absorption capacity, and the higher degree of crosslinking on the surface can give a high gel strength; and II, since the water absorption rate decreases as the degree of crosslinking increases, by controlling the degree of crosslinking on the surface of the primary polymer water-absorbent resin, the polymer water-absorbent resin has the effect of delayed expansion, so that the granular material has enough time to enter the depth of the water-rich fracture zone, and thus, the plugging material in the fracture zone has the effects of expansion and filling as well as internal squeezing and compaction.

In step (3), the surface crosslinking agent is added in a proportion of 3-6% by mass of the primary polymer water-absorbent resin in step (2).

In step (4), the inorganic water conducting agent includes: fumed silica, nano titania or activated alumina powder, and the inorganic water conducting agent is added in a proportion of 0.5-1.5% by mass of the primary polymer water-absorbent resin in step (2). Further, the inorganic water conducting agent suspension may be made by mixing the inorganic water conducting agent and water.

The grouting material prepared in the present invention is a granular polymer water-absorbent resin material, but its surface area and surface structure have a great influence on the water absorption rate. Although the smaller the diameter of the granules, the larger the surface area and the higher the water absorption rate, "agglomeration" will occur when the granule diameter is too small. That is, a layer of soft gel is formed on the surface of the grouting material immediately after the grouting material contacts water, which prevents water molecules from entering the inside of the water-absorbent material, that is, the surface gels, and the grouting material is like an "unkneaded dough" and becomes a sandwich in which the core does not absorb water, so that the granules cannot fully contact water, which leads to a decrease in the water absorption rate. According to the present invention, under the condition of ensuring a certain granule size, the surface of the prepared grouting material is wrapped with the inorganic water conducting agent, so that after the grouting material contacts water, the surface is not prone to gel and will not prevent water from uniformly seeping into the granules. Since the granular water conducting agent wrapping the surface of the grouting material can separate the granular grouting material and avoid direct contact between the grouting material granules, a certain gap exists between the grouting material granules, and the water molecules can enter, thereby avoiding "agglomeration".

In steps (3) and (4), the drying conditions are: aeration-drying at 100-120° C. for 20-60 min.

Secondly, the present invention provides another preparation method of an expansive polymer grouting material for treating high-pressure large-flow-rate karst water inrush, which is different from the aforementioned first grouting material preparation method in that: when a precursor is prepared in step (1), firstly, acrylic acid is incompletely neutralized with lye to obtain an incompletely neutralized solution containing acrylic acid, where a degree of neutralization of the incompletely neutralized solution is maintained at 40%-90%, then the above incompletely neutralized solution and a crosslinking agent are mixed and subjected to a polymerization reaction with a polymer water-absorbent resin comonomer to obtain the precursor, and the subsequent steps are the same as steps (2)-(4) above. Preferably, the neutralization is realized by slowly adding the lye to the acrylic acid solution in an ice water bath.

The lye includes sodium hydroxide, calcium hydroxide or a mixed solution of both, and a concentration of the lye is 20-50 wt %.

The degree of neutralization refers to the degree to which the neutralization reaction is carried out, and in the present invention, the part of the acrylic acid neutralized by the lye. For example, if 50% of the acrylic acid monomer in the acrylic acid solution is neutralized, the degree of neutralization is 50%. If the degree of neutralization is low, the acrylic acid has high concentration and high activity, the polymerization rate is high, and a self-polymerization reaction is prone to occur to form a polymer with too high degree of crosslinking, so that the water absorptivity of the product is reduced. As the degree of neutralization increases, the reaction rate decreases, and the degree of crosslinking decreases. If the degree of neutralization is too high, the concentration of sodium carboxylate in the system is too high, the reaction rate decreases, and the product has a lower degree of crosslinking and a higher water solubility, which easily leads to a decrease in the water absorption rate of the product. Therefore, it is recommended in the present invention that the degree of neutralization of the incompletely neutralized solution is maintained at 40%-90%.

The reasons for neutralizing the acrylic acid are as follows: firstly, since the molecular chain of the acrylic acid has a higher flexibility, when the molecular weight is high, the molecular chain is highly curled, and a large number of carboxyl functional groups curled inside fail to effectively absorb water. Carboxyls on the molecular chain are difficult to ionize and hydrate under acidic conditions, so only after the acrylic acid is partially neutralized into a salt, electrostatic repulsion can be produced between the molecular chains of the obtained polymer and the product can have high water absorption rate. Secondly, when the degree of neutralization of the acrylic acid is less than 90%, the absorption rate will increase as the degree of neutralization increases, and when the degree of neutralization is greater than 90%, the absorption rate will decrease as the degree of neutralization increases. When the degree of neutralization is low, the acrylic acid has high concentration and activity, the polymerization rate is high, and a self-polymerization reaction is prone to occur to form a polymer with too high degree of crosslinking, so that the water absorption rate decreases. When the degree of neutralization is high, the reaction rate decreases, and the degree of crosslinking is too low, so that the water solubility increases, resulting in a decrease in the water absorption rate of the product.

Thirdly, the present invention discloses an expansive polymer grouting material obtained by the above preparation method, which is characterized in that: the grouting material has a core-shell structure and is a polyacrylic acid polymer water-absorbent resin, where the primary polymer water-absorbent resin obtained in step (2) is the core, and the surface crosslinking agent and the water conducting agent respectively added in step (3) and step (4) form the shell.

Fourthly, based on the characteristics of the expansive polymer grouting material for treating high-pressure large-flow-rate karst water inrush prepared in the present invention, the present invention provides an expansive polymer grouting material composition, including the expansive polymer grouting material prepared in the present invention and a carrying fluid. A mass ratio of the expansive polymer grouting material to the carrying fluid is 1-2:1-5.

Since the expansive polymer grouting material prepared in the present invention has superhigh water absorptivity, when it is injected into gushing water, the expansion rate is too high. In general cases, it takes a very long time to inject the expansive polymer grouting material into the depth of the fracture zone, and this will result in a complete expansion of the expansive polymer grouting material before it reaches the expected depth, so that the expansive polymer grouting material cannot well exert its high performance and fails to achieve the purpose of plugging. Therefore, in the present invention, the carrying fluid is used to inhibit the expansion of the expansive polymer grouting material, carry the expansive polymer grouting material into the water-rich formation in the depth of the fracture zone, and make the expansive polymer grouting material absorb water and swell within a controlled period of time, thereby completing the blocking.

The carrying fluid recommended by the present invention needs to have the following criteria:

(1) The carrying fluid should be capable of inhibiting the expansion of the expansive polymer grouting material within a certain period of time.

(2) The carrying fluid should have good suspension and granule carrying capacities.

(3) The carrying fluid should have stable properties under room temperature, high temperature or high pressure.

(4) When the polymer water-absorbent resin enters the water-rich fracture zone, the carrying fluid should be capable of immediately making the polymer water-absorbent resin fully contact water, so that the polymer water-absorbent resin absorbs water and swells in the fracture zone, thereby blocking the gushing water.

(5) The polymer water-absorbent resin should be incapable of chemically reacting with the carrying fluid.

(6) The carrying fluid should be environmentally friendly and pollution-free and have no environmental influence on underground water.

Preferably, the carrying fluid includes one or both of glycerol and ethanol. Not all of criteria that the carrier fluid of the present invention needs to have at the same time are listed. As long as it is conducive to inhibit the expansion of the expansive polymer grouting material and can make the expansive polymer grouting material absorb water and swell within a controlled period of time after carrying the expansive polymer grouting material into the depth of the fracture zone, thereby completing the blocking, it may also be used as the carrying fluid. In addition, for other grouting materials that realize blocking of gushing water through expansion, a technical idea similar to that of the carrying fluid provided in the present invention may also be used, and the blocking is realized after a suitable carrier is used to carry the grouting material to a suitable position.

Finally, the present invention discloses application of the expansive polymer grouting material for treating high-pressure large-flow-rate karst water inrush and the preparation method thereof, and the expansive polymer grouting material composition described above in the field of construction engineering, especially in water inrush treatment.

Compared with the prior art, the present invention has the following beneficial effects:

(1) The expansive polymer grouting material prepared in the present invention is green and pollution-free, and has an adjustable gelation time within 1-60 minutes and a super-high water swellability (the expansion rate is up to 101-304 times).

(2) The expansive polymer grouting material prepared in the present invention has stable and controllable expansion time, so that the expansion rate can be controlled according to the engineering needs, thereby ensuring that the grout has good operability and engineering applicability.

(3) In the expansive polymer grouting material composition with different gradations prepared in the present invention, after absorbing water and swelling, the small-granule grouting material can effectively reduce the fluidity of water in the fissures of the fracture zone, increase the viscous force of the water in the fissures and reduce the flow velocity of the water in the fissures. After absorbing water and swelling, the large-granule polymer water-absorbent resin can be effectively stuck between the rock blocks of the water-rich fracture zone and continuously accumulate, so that the discharge area of the water-rich fracture zone is reduced, and the flow rate of the gushing water is effectively reduced.

(4) The expansive polymer grouting material prepared in the present invention can form a viscoelastic body after absorbing water, and the viscoelastic body can be deformed under a certain pressure and is not limited by the shape of pores and cracks. Since the blocking time of the expansive polymer grouting material of the present invention is short, as long as a water-absorbent resin with a suitable granular size and a suitable injection pressure are selected, effective blocking can generally be realized in a short time.

(5) In the use method of the expansive polymer grouting material composition prepared in the present invention, when the water-rich fracture zone is blocked, an expansive polymer grouting material with a smaller granular size is firstly injected, and then an expansive polymer grouting material with a larger granular size is injected, so that a better blocking effect and a better pressure bearing capacity can be obtained while a longer blocking and shielding zone is formed.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

DETAILED DESCRIPTION

Figure 1:
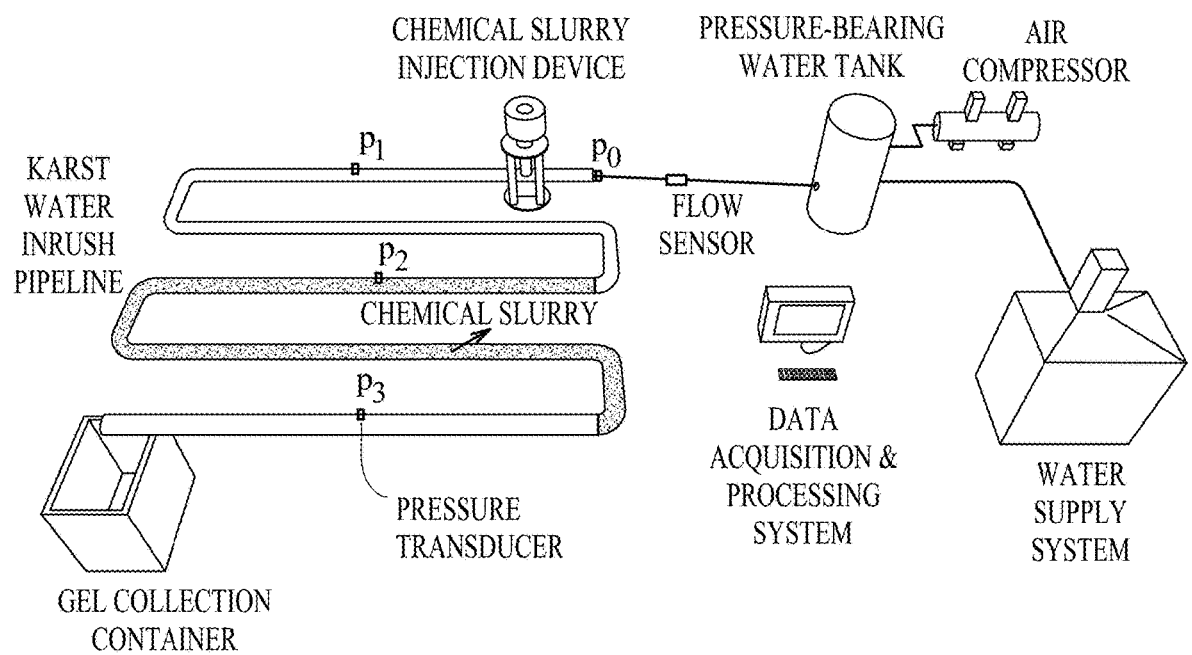
FIG. 1 is a visualized simulated high-pressure large-flow-rate water inrush blocking device according to the present invention.

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

As described in the background art, although the existing cement-based grouting materials are cheap and environmentally friendly and have the effect of reinforcing fault fracture zones, such materials have longer initial and final setting time and poor water scouring resistance, and are easily scoured in the water-rich formations. Therefore, such materials have a low retention rate in the formation when blocking gushing water, so the grouting blocking effect is not ideal. Common chemical grouting materials have the advantage of controllable gelation time, but under the scouring of flowing water, they can easily form a linear consolidated body along the water flow and be washed out by water. Therefore, the present invention provides an expansive polymer grouting material for treating high-pressure large-flow-rate karst water inrush and a preparation method thereof. The present invention will be further described below in conjunction with the accompanying drawings and specific implementations.

Example 1

1. A preparation method of an expansive polymer grouting material for treating high-pressure large-flow-rate karst water inrush included the following steps:

(1) An acrylic acid monomer was diluted with deionized water to obtain 80 g of acrylic acid solution with a concentration of 45%, then 0.2 g of N,N-methylenebisacrylamide was added to the acrylic acid solution, and the mixture was stirred with a magnetic stirrer for 10 min. Then 1.5 g of polyvinyl alcohol was added, and a polymerization reaction was performed for 1.5 h to obtain a precursor solution.

(2) Potassium persulfate, dimethyl azobisisobutyrate and potassium persulfate/ferrous chloride were blended at a mass ratio of 2:1:1 to obtain an initiator, 0.108 g of the initiator was added to the precursor solution obtained in step (1), the temperature was gradually increased from 4° C. to 75° C. (at a rate of 2° C./min), a reaction was performed for 15 minutes to obtain a hydrogel, and the hydrogel was ground to obtain a primary polymer water-absorbent resin.

(3) Water, glycerol, ethylene carbonate and silver nitrate were blended at a mass ratio of 100:30:30:5 to obtain a surface crosslinking agent, the surface crosslinking agent was sprayed onto a surface of the primary polymer water-absorbent resin obtained in step (2), where the surface crosslinking agent was added in a proportion of 4.5% by mass of the primary polymer water-absorbent resin, and then the resin was placed in a 100° C. drying oven and subjected to a reaction for 60 min.

(4) 1.6 g of fumed silica and 30 g of water were mixed and sufficiently stirred to obtain a suspension, the suspension was sprayed onto a surface of the water-absorbent resin obtained in step (3), and then the obtained product was placed in a drying oven, subjected to aeration-drying at 120° C. for 30 min, and cooled to room temperature. Finally, steps (3) and (4) were repeated twice to obtain the granular expansive polymer grouting material.

Experimental Example 1

1. A preparation method of an expansive polymer grouting material for treating high-pressure large-flow-rate karst water inrush was different from Example 1 in that: in step (2), the initiator was only potassium persulfate, which serves as both an inorganic peroxide initiator and an oxidation initiator. That is, compared with Example 1, no azo initiator was added in Experimental Example 1.

Example 2

A preparation method of an expansive polymer grouting material for treating high-pressure large-flow-rate karst water inrush included the following steps:

(1) An acrylic acid monomer was diluted with deionized water to obtain 80 g of acrylic acid solution with a concentration of 30%, sodium hydroxide at a mass fraction of 20% was slowly added in an ice water bath to neutralize the acrylic acid aqueous solution to obtain an incompletely neutralized solution containing acrylic acid, of which the degree of neutralization was 45%. Then 0.252 g of pentaerythritol tetraester was added to the incompletely neutralized solution, and the mixture was stirred with a magnetic stirrer for 8 min. Then 1.8 g of polyvinyl alcohol was added, and a polymerization reaction was performed for 1.0 h to obtain a precursor solution.

(2) Hydrogen peroxide, azobisisoheptonitrile and potassium persulfate/ferrous chloride were blended at a mass ratio of 1:2:7 to obtain an initiator, 0.152 g of the initiator was added to the precursor solution obtained in step (1), the temperature was gradually increased from 10° C. to 70° C. (at a rate of 3° C./min), a reaction was performed for 15 minutes to obtain a hydrogel, and the hydrogel was ground to obtain a primary polymer water-absorbent resin.

(3) Water, glycerol, ethylene carbonate and silver nitrate were blended in a mass ratio of 100:30:20:3 to obtain a surface crosslinking agent, the surface crosslinking agent was sprayed onto a surface of the primary polymer water-absorbent resin obtained in step (2), where the surface crosslinking agent was added in a proportion of 3.5% by mass of the primary polymer water-absorbent resin, and then the resin was placed in a 100° C. drying oven and subjected to a reaction for 60 min.

(4) Fumed silica and 25 g of water were mixed and sufficiently stirred to obtain a suspension, where the fumed silica accounted for 1% by mass of the primary polymer water-absorbent resin in step (2), the suspension was sprayed onto a surface of the water-absorbent resin obtained in step (3), and then the obtained product was placed in a drying oven, subjected to aeration-drying at 100° C. for 60 min and cooled to room temperature. Finally, steps (3) and (4) were repeated twice to obtain the granular expansive polymer grouting material.

Experimental Example 2

1. A preparation method of an expansive polymer grouting material for treating high-pressure large-flow-rate karst water inrush was different from Example 2 in that: the temperature was gradually increased from 45° C. to 70° C.

Example 3

A preparation method of an expansive polymer grouting material for treating high-pressure large-flow-rate karst water inrush included the following steps:

(1) An acrylic acid monomer was diluted with deionized water to obtain 120 g of acrylic acid solution with a concentration of 30%, calcium hydroxide at a mass fraction of 30% was slowly added in an ice water bath to neutralize the acrylic acid aqueous solution to obtain an incompletely neutralized solution containing acrylic acid, of which the degree of neutralization was 60%. Then 0.720 g of pentaerythritol triallyl ether was added to the incompletely neutralized solution, and the mixture was stirred with a magnetic stirrer for 11 min. Then 3.6 g of acrylamide was added, and a polymerization reaction was performed for 1.5 h to obtain a precursor solution.

(2) Potassium persulfate, dimethyl azobisisobutyrate and potassium persulfate/ferrous chloride were blended at a mass ratio of 2:1:1 to obtain an initiator, 0.165 g of the initiator was added to the precursor solution obtained in step (1), the temperature was gradually increased from 15° C. to 75° C. (at a rate of 2° C./min), a reaction was performed for 15 minutes to obtain a hydrogel, and the hydrogel was ground to obtain a primary polymer water-absorbent resin.

(3) Water, ethylene glycol, ethylene carbonate and silver nitrate were blended at a mass ratio of 100:30:20:3 to obtain a surface crosslinking agent, the surface crosslinking agent was sprayed onto a surface of the primary polymer water-absorbent resin obtained in step (2), where the surface crosslinking agent was added in a proportion of 6% by mass of the primary polymer water-absorbent resin, and then the resin was placed in a 100° C. drying oven and subjected to a reaction for 60 min.

(4) Fumed silica and 20 g of water were mixed and sufficiently stirred to obtain a suspension, where the fumed silica accounted for 1.2% by mass of the primary polymer water-absorbent resin in step (2), the suspension was sprayed onto a surface of the water-absorbent resin obtained in step (3), and then the obtained product was placed in a drying oven, subjected to aeration-drying at 120° C. for 20 min and cooled to room temperature. Finally, steps (3) and (4) were repeated twice to obtain the granular expansive polymer grouting material.

Experimental Example 3

1. A preparation method of an expansive polymer grouting material for treating high-pressure large-flow-rate karst water inrush was different from Example 3 in that: no surface crosslinking agent was added.

Example 4

A preparation method of an expansive polymer grouting material for treating high-pressure large-flow-rate karst water inrush included the following steps:

(1) An acrylic acid monomer was diluted with deionized water to obtain 140 g of acrylic acid solution with a concentration of 25%, calcium hydroxide at a mass fraction of 50% was slowly added in an ice water bath to neutralize the acrylic acid aqueous solution to obtain an incompletely neutralized solution containing acrylic acid, of which the degree of neutralization was 40%. Then 0.5 g of ethoxylated glycerol triacrylate was added to the incompletely neutralized solution, and the mixture was stirred with a magnetic stirrer for 7 min. Then 5 g of polyvinyl alcohol was added, and a polymerization reaction was performed for 1.2 h to obtain a precursor solution.

(2) Ammonium persulfate, azobisisobutyronitrile and hydrogen peroxide/ferrous sulfate were blended at a mass ratio of 2:2:3 to obtain an initiator, 0.035 g of the initiator was added to the precursor solution obtained in step (1), the temperature was gradually increased from 0° C. to 85° C. (at a rate of 2° C./min), a reaction was performed for 25 minutes to obtain a hydrogel, and the hydrogel was ground to obtain a primary polymer water-absorbent resin.

(3) Glycidyl ether, propylene glycol, propylene carbonate and silver nitrate were blended at a mass ratio of 100:20:30:5 to obtain a surface crosslinking agent, the surface crosslinking agent was sprayed onto a surface of the primary polymer water-absorbent resin obtained in step (2), where the surface crosslinking agent was added in a proportion of 5% by mass of the primary polymer water-absorbent resin, and then the resin was placed in a 110° C. drying oven and subjected to a reaction for 40 min.

(4) Nano titania and 20 g of water were mixed and sufficiently stirred to obtain a suspension, where the nano titania accounted for 0.5% by mass of the primary polymer water-absorbent resin in step (2), the suspension was sprayed onto a surface of the water-absorbent resin obtained in step (3), and then the obtained product was placed in a drying oven, subjected to aeration-drying at 105° C. for 30 min and cooled to room temperature. Finally, steps (3) and (4) were repeated twice to obtain the granular expansive polymer grouting material.

Experimental Example 4

1. A preparation method of an expansive polymer grouting material for treating high-pressure large-flow-rate karst water inrush was different from Example 4 in that: step (4) did not include adding the water conducting agent, but only included aeration-drying the product finally obtained in step (3).

Example 5

A preparation method of an expansive polymer grouting material for treating high-pressure large-flow-rate karst water inrush included the following steps:

(1) An acrylic acid monomer was diluted with deionized water to obtain 80 g of acrylic acid solution with a concentration of 35%, sodium hydroxide at a mass fraction of 40% was slowly added in an ice water bath to neutralize the acrylic acid aqueous solution to obtain an incompletely neutralized solution containing acrylic acid, of which the degree of neutralization was 80%. Then 0.14 g of polyethylene glycol diglycidyl ether was added to the incompletely neutralized solution, and the mixture was stirred with a magnetic stirrer for 15 min. Then 0.028 g of acrylonitrile was added, and a polymerization reaction was performed for 1.5 h to obtain a precursor solution.

(2) Sodium persulfate, dimethyl azobisisobutyrate and ammonium persulfate/ferrous sulfate were blended at a mass ratio of 1:2:5 to obtain an initiator, 0.168 g of the initiator was added to the precursor solution obtained in step (1), the temperature was gradually increased from 5° C. to 70° C. (at a rate of 3° C./min), a reaction was performed for 30 minutes to obtain a hydrogel, and the hydrogel was ground to obtain a primary polymer water-absorbent resin.

(3) Ethylene glycol, propylene glycol and cupric chloride were blended at a mass ratio of 100:40:3 to obtain a surface crosslinking agent, the surface crosslinking agent was sprayed onto a surface of the primary polymer water-absorbent resin obtained in step (2), where the surface crosslinking agent was added in a proportion of 3% by mass of the primary polymer water-absorbent resin, and then the resin was placed in a 115° C. drying oven and subjected to a reaction for 30 min.

(4) Fumed silica and 25 g of water were mixed and sufficiently stirred to obtain a suspension, where the fumed silica accounted for 1.4% by mass of the primary polymer water-absorbent resin in step (2), the suspension was sprayed onto a surface of the water-absorbent resin obtained in step (3), and then the obtained product was placed in a drying oven, subjected to aeration-drying at 100° C. for 20 min and cooled to room temperature. Finally, steps (3) and (4) were repeated twice to obtain the granular expansive polymer grouting material.

Experimental Example 5

1. A preparation method of an expansive polymer grouting material for treating high-pressure large-flow-rate karst water inrush was different from Example 5 in that: in step (1), the acrylic acid was completely neutralized into sodium acrylate.

Example 6

A preparation method of an expansive polymer grouting material for treating high-pressure large-flow-rate karst water inrush included the following steps:

(1) An acrylic acid monomer was diluted with deionized water to obtain 80 g of acrylic acid solution with a concentration of 35%, sodium hydroxide at a mass fraction of 40% was slowly added in an ice water bath to neutralize the acrylic acid aqueous solution to obtain an incompletely neutralized solution containing acrylic acid, of which the degree of neutralization was 90%. Then 0.42 g of polyethylene glycol diglycidyl ether was added to the incompletely neutralized solution, and the mixture was stirred with a magnetic stirrer for 15 min. Then 4.2 g of methacrylamide was added, and a polymerization reaction was performed for 1.5 h to obtain a precursor solution.

(2) Sodium persulfate, dimethyl azobisisobutyrate and ammonium sulfate/sodium bisulfite were blended at a mass ratio of 1:3:5 to obtain an initiator, 0.196 g of the initiator was added to the precursor solution obtained in step (1), the temperature was gradually increased from 5° C. to 70° C. (at a rate of 3° C./min), a reaction was performed for 30 minutes to obtain a hydrogel, and the hydrogel was ground to obtain a primary polymer water-absorbent resin.

(3) Ethylene glycol, propylene glycol and cupric chloride were blended at a mass ratio of 100:40:3 to obtain a surface crosslinking agent, the surface crosslinking agent was sprayed onto a surface of the primary polymer water-absorbent resin obtained in step (2), where the surface crosslinking agent was added in a proportion of 5.5% by mass of the primary polymer water-absorbent resin, and then the resin was placed in a 120° C. drying oven and subjected to a reaction for 20 min.

(4) Activated alumina powder (particle size 60-80 nm) and 15 g of water were mixed and sufficiently stirred to obtain a suspension, where the activated alumina powder accounted for 1.5% by mass of the primary polymer water-absorbent resin in step (2), the suspension was sprayed onto a surface of the water-absorbent resin obtained in step (3), and then the obtained product was placed in a drying oven, subjected to aeration-drying at 100° C. for 20 min and cooled to room temperature. Finally, steps (3) and (4) were repeated twice to obtain the granular expansive polymer grouting material.

Example 7

A preparation method of an expansive polymer grouting material for treating high-pressure large-flow-rate karst water inrush included the following steps:

(1) An acrylic acid monomer was diluted with deionized water to obtain 100 g of acrylic acid solution with a concentration of 40%, calcium hydroxide at a mass fraction of 25% was slowly added in an ice water bath to neutralize the acrylic acid aqueous solution to obtain an incompletely neutralized solution containing acrylic acid, of which the degree of neutralization was 70%. Then 0.72 g of ethylene glycol dimethacrylate was added to the incompletely neutralized solution, and the mixture was stirred with a magnetic stirrer for 12 min. Then 1.8 g of polyvinyl alcohol and 1 g of montmorillonite were added, and a polymerization reaction was performed for 1.5 h to obtain a precursor solution.

(2) Potassium persulfate, azobisisobutyronitrile and potassium persulfate/ferrous chloride were blended at a mass ratio of 5:1:7 to obtain an initiator, 0.08 g of the initiator was added to the precursor solution obtained in step (1), the temperature was gradually increased from 15° C. to 65° C. (at a rate of 2° C./min), a reaction was performed for 20 minutes to obtain a hydrogel, and the hydrogel was ground to obtain a primary polymer water-absorbent resin.

(3) Ethylene glycol, propylene glycol and silver nitrate were blended at a mass ratio of 100:40:1 to obtain a surface crosslinking agent, the surface crosslinking agent was sprayed onto a surface of the primary polymer water-absorbent resin obtained in step (2), where the surface crosslinking agent was added in a proportion of 4% by mass of the primary polymer water-absorbent resin, and then the resin was placed in a 105° C. drying oven and subjected to a reaction for 35 min.

(4) Titania and 18 g of water were mixed and sufficiently stirred to obtain a suspension, where the fumed titania accounted for 0.9% by mass of the primary polymer water-absorbent resin in step (2), the suspension was sprayed onto a surface of the water-absorbent resin obtained in step (3), and then the obtained product was placed in a drying oven, subjected to aeration-drying at 120° C. for 20 min and cooled to room temperature. Finally, steps (3) and (4) were repeated twice to obtain the granular expansive polymer grouting material.

Figure 2:
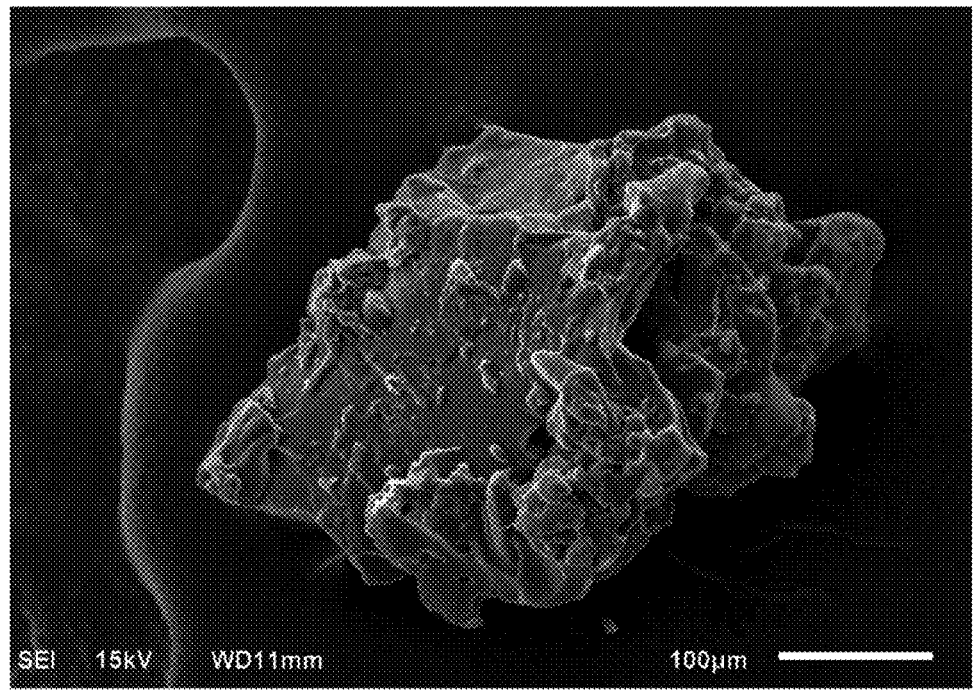
FIG. 2 is an SEM image of an expansive polymer grouting material prepared in Example 1.
Figure 3:
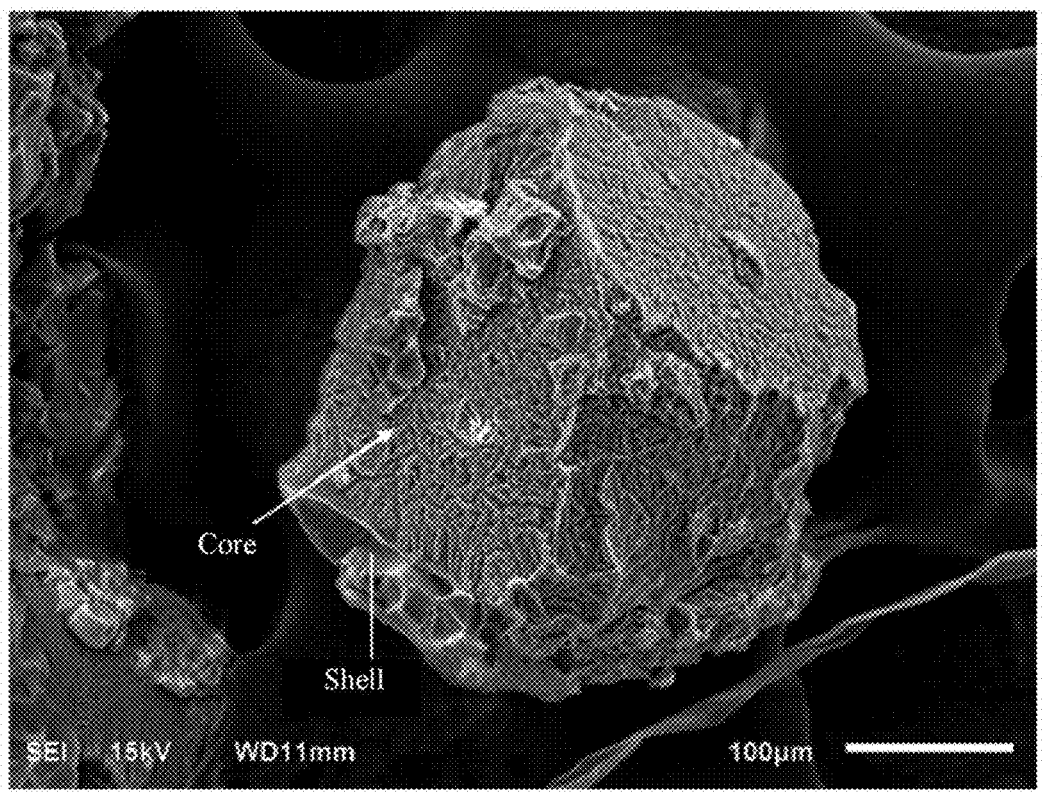
FIG. 3 is an SEM image of an expansive polymer grouting material prepared in Example 2.

Performance Tests:

1. The microstructures of the expansive polymer grouting materials prepared in Example 1 and 2 were observed under a scanning electron microscope. The results are respectively shown in FIG. 2 and FIG. 3. It can be seen from FIG. 3 that the expansive polymer grouting material prepared in the present invention shows an obvious core-shell structure, where the primary polymer water-absorbent resin obtained in step (2) is the core and the surface crosslinking agent and the water conducting agent respectively added in steps (3) and (4) form the shell. In FIG. 2, the shell has completely covered the core.

Figure 4:
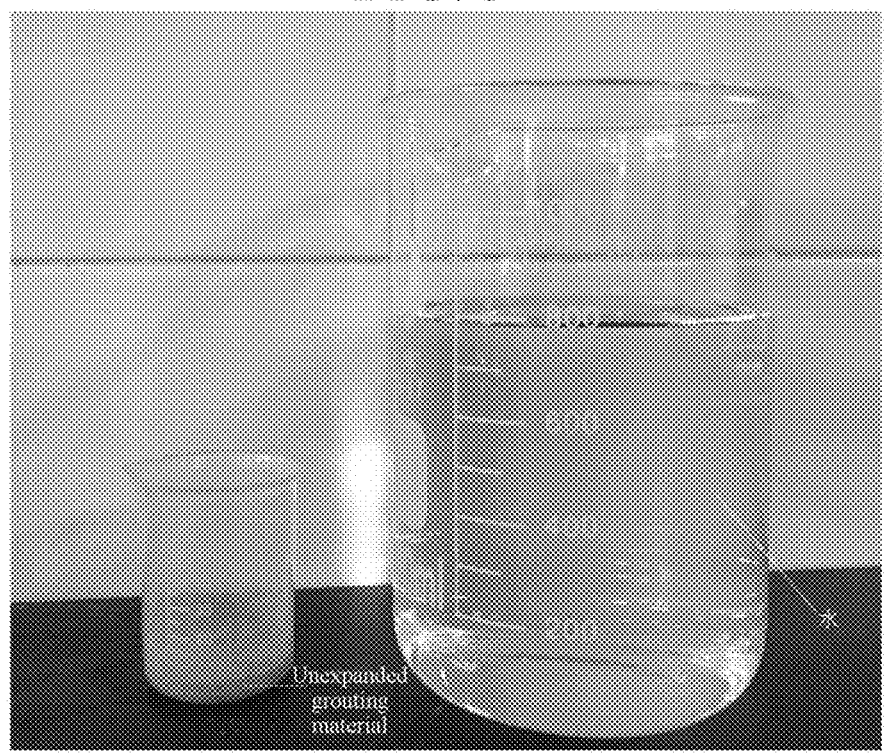
FIG. 4 is a picture of an expansive polymer grouting material prepared in Example 3 in an unexpanded state.
Figure 5:
FIG. 5 is a picture of the expansive polymer grouting material prepared in Example 3 in an expanded state.

2. The expansion effect of the expansive polymer grouting material prepared in Example 3 was tested. The results are shown in FIGS. 4 and 5. In FIG. 4, the small beaker on the left side contains 150 g of unexpanded grouting material (about 5 ml), and the large beaker on the right side contains 800 ml of tap water. After the unexpanded grouting material is added to the tap water in the large beaker, the results are shown in FIG. 5. It can be seen that the tap water has been completely absorbed, the volume of the grouting material has expanded to about 810-820 ml, and the expansion rate has reached 162 times. The expansion effects of the expansive polymer grouting materials prepared in Examples 1, 2 and 4-7 were tested by the same method, and the expansion rates were respectively 101, 217, 304, 186, 264 and 288 times, indicating that the grouting material of the present invention has a good water absorption rate and a good expansion rate.

3. In order to research the diffusion mechanism and the gushing water blocking effect of the polymer water-absorbent resin in a water-bearing structure, the present invention uses the following visualized simulated high-pressure large-flow-rate water inrush blocking device (as shown in FIG. 1) to effectively test the water blocking capacity of the expansive polymer grouting materials prepared in the examples and experimental examples under flowing water conditions. The reasonable grouting water blocking parameters are determined and the blocking effect is evaluated, thereby providing a theoretical basis for further research on new material grouting water blocking processes. The visualized simulated high-pressure large-flow-rate water inrush blocking device includes the following four parts: a flowing water supply system, an expansive polymer grouting material injection system, a grout storage and transmission pipeline system and a data acquisition and processing system. The grout storage and transmission pipeline system is composed of detachable and recombinable acrylic pipes, screw jacks, metal filter screens and grout-water collection tanks. A pipeline inlet is connected to a stabilized-pressure water source supply system through a high-pressure hose, and the high-pressure hose is provided with a flow valve. An outlet of the acrylic pipe is provided with the grout-water collection tank. A grout injection hole is arranged in front of the acrylic pipe, and a grouting pipe connected with the injection hole is provided with a flow valve. The data acquisition and processing system includes flowing water flow rate sensors mounted on the acrylic pipes, and a high-definition camera system. As shown in the device below, the flow rate sensors and water flow pressure sensors are used to acquire and record the water flow velocity and water flow pressure at different positions of the flowing water grouting in real time, and are connected with a computer control system to realize the automatic measurement of the test process.

The experimental procedure for testing water inrush blocking of the expansive polymer grouting material was as follows:

Step 1: A grouting pump was connected to a grouting perforated pipe through a high-pressure transmission pipe, the perforated pipe was inserted into the grout injection hole at the inlet end of the acrylic pipe, and a grouting pressure sensor and a grouting flow sensor were arranged.

Step 2: The flow rate and flow velocity of the water inrush were determined according to geological conditions of the fracture zone during the construction, a pressure controller of the water supply system was adjusted to provide flowing water conditions similar to the project, the water flow rate sensors and water flow pressure sensors were distributed at the bottom and the middle of the acrylic pipe, the screw jacks were adjusted to adjust the acrylic pipe to a horizontal state.

Step 3: The flow-rate sensors and the pressure sensors were connected to a data acquisition device, and acquisition frequency and data storage parameters were set.

Step 4: A granular grouting material was added to the grouting pump. The pressure controller was adjusted to supply flowing water of different flow velocities to the cross pipes. After the flow velocity became stable, the grouting pump was turned on, and the grouting pressure was set to a preset value.

Step 5: After the granular grouting material diffused to the boundary of the water outlet or the flow of the flowing water was completely blocked by the granular material, grouting was stopped. The hydraulic blocking conditions of the granular grouting material under different flow rates were observed and recorded in real time.

Step 6: The acrylic pipes at the blocked pressure test section were removed and connected to the flowing water supply device through a flange. After the connection was completed, a hydraulic pressure was slowly applied to the granular blocking material. The ultimate pressure bearing capacity of the blocked section was tested, thereby quantitatively evaluating the blocking effect.

Step 8: By changing different test conditions, the effects of the amount of the expansive polymer grouting material at different flowing water flow velocities on the grout diffusion law and the flowing water blocking could be obtained.

Step 9: The granular material, the granular material injection system and the test platform were cleaned.

TABLE 1

Experimental results of high-pressure large-flow-rate water inrush of Example 1 and Experimental Example 1
(pipeline 30 m in length, 60 mm in inner diameter)

| | | No. 1 | | No. 2 | | No. 3 | | | No. 4 | | | No. 5 | | |
|---|---|---|---|---|---|---|---|---|---|---|---|---|---|---|
| | | Flow rate (L/min) | | | | | | | | | | | | |
| | | 10 | | 20 | | 30 | | | 40 | | | 50 | | |
| | | Example | Experimental Example | Example | Experimental Example | Example | Experimental Example | | Example | Experimental Example | | Example | Experimental Example | |
| Flow velocity (m/s) | | 0.13 | 0.13 | 0.27 | 0.27 | 0.40 | 0.40 | | 0.53 | 0.53 | | 0.66 | 0.66 | |
| Grouting amount | Expansive polymer grouting material/g | 150 | 150 | 250 | 250 | 300 | 300 | 350 | 450 | 450 | 505 | 500 | 500 | 565 |
| | Mass of carrying fluid/g | 225 | 225 | 375 | 375 | 450 | 450 | 450 | 675 | 675 | 675 | 750 | 750 | 750 |
| Whether the blocking is successful | | Yes | Yes | Yes | Yes | Yes | No | Yes | Yes | No | Yes | Yes | No | Yes |
| Blocking length (m) | | 7.4 | 9.3 | 8.6 | 10.2 | 9.6 | | 11.4 | 11.5 | | 13.1 | 13.6 | | 15.6 |

TABLE 2

Experimental results of high-pressure large-flow-rate water inrush of Example 2 and Experimental Example 2
(pipeline 30 m in length, 60 mm in inner diameter)

| | | No. | | | | | | | | | | | |
|---|---|---|---|---|---|---|---|---|---|---|---|---|---|
| | | 1 | | 2 | | 3 | | | 4 | | | 5 | |
| | | Flow rate (L/min) | | | | | | | | | | | |
| | | 10 | | 20 | | 30 | | | 40 | | | 50 | |
| | | Example | Experimental Example | Example | Experimental Example | Example | Experimental Example | | Example | Experimental Example | | Example | Experimental Example 1 |
| Flow velocity (m/s) | | 0.13 | 0.13 | 0.27 | 0.27 | 0.40 | 0.40 | | 0.53 | 0.53 | | 0.66 | 0.66 |
| Grouting amount | Expansive polymer grouting material/g | 150 | 150 | 250 | 250 | 300 | 300 | 350 | 450 | 450 | 505 | 500 | 500 | 565 |
| | Mass of carrying fluid/g | 225 | 225 | 375 | 375 | 450 | 450 | 450 | 675 | 675 | 675 | 750 | 750 | 750 |
| Whether the blocking is successful | | Yes | Yes | Yes | Yes | Yes | No | Yes | Yes | No | Yes | Yes | No | Yes |
| Blocking length (m) | | 6.8 | 8.3 | 7.9 | 9.6 | 9.1 | | 10.9 | 11.2 | | 13.2 | 12.6 | | 14.5 |

TABLE 3

Experimental results of high-pressure large-flow-rate water inrush of Example 3 and Experimental Example 3
(pipeline 30 m in length, 60 mm in inner diameter)

| | | No. | | | | | | | | | | | |
|---|---|---|---|---|---|---|---|---|---|---|---|---|---|
| | | 1 | | 2 | | 3 | | | 4 | | | 5 | |
| | | Flow rate (L/min) | | | | | | | | | | | |
| | | 10 | | 20 | | 30 | | | 40 | | | 50 | |
| | | Example | Experimental Example | Example | Experimental Example | Example | Experimental Example | | Example | Experimental Example | | Example | Experimental Example 1 |
| Flow velocity (m/s) | | 0.13 | 0.13 | 0.27 | 0.27 | 0.40 | 0.40 | | 0.53 | 0.53 | | 0.66 | 0.66 |
| Grouting amount | Expansive polymer grouting material/g | 150 | 150 | 250 | 250 | 300 | 300 | 350 | 450 | 450 | 505 | 500 | 500 | 565 |
| | Mass of carrying fluid/g | 225 | 225 | 375 | 375 | 450 | 450 | 450 | 675 | 675 | 675 | 750 | 750 | 750 |
| Whether the blocking is successful | | Yes | Yes | Yes | Yes | Yes | No | Yes | Yes | No | Yes | Yes | No | Yes |
| Blocking length (m) | | 7.1 | 8.5 | 8.2 | 9.9 | 8.9 | | 10.7 | 10.8 | | 12.8 | 12.9 | | 15.1 |

TABLE 4

Experimental results of high-pressure large-flow-rate water inrush of Example 4 and Experimental Example 4
(pipeline 30 m in length, 60 mm in inner diameter)

| | | No. 1 | | No. 2 | | No. 3 | | No. 4 | | No. 5 | |
|---|---|---|---|---|---|---|---|---|---|---|---|
| | | Flow rate (L/min) | | | | | | | | | |
| | | 10 | | 20 | | 30 | | 40 | | 50 | |
| | | Example | Experimental Example | Example | Experimental Example | Example | Experimental Example | Example | Experimental Example | Example | Experimental Example 1 |
| Flow velocity (m/s) | | 0.13 | 0.13 | 0.27 | 0.27 | 0.40 | 0.40 | 0.53 | 0.53 | 0.66 | 0.66 |
| Grouting amount | Expansive polymer grouting material/g | 150 | 150 | 250 | 250 | 300 | 300 / 350 | 450 | 450 / 505 | 500 | 500 / 565 |
| | Mass of carrying fluid/g | 225 | 225 | 375 | 375 | 450 | 450 / 450 | 675 | 675 / 675 | 750 | 750 / 750 |
| Whether the blocking is successful | | Yes | Yes | Yes | Yes | Yes | No / Yes | Yes | No / Yes | Yes | No / Yes |
| Blocking length (m) | | 6.4 | 7.7 | 7.1 | 8.6 | 8.6 | 10.3 | 10.4 | 12.3 | 12.3 | 14.4 |

TABLE 5

Experimental results of high-pressure large-flow-rate water inrush of Example 5 and Experimental Example 5
(pipeline 30 m in length, 60 mm in inner diameter)

| | | No. 1 | | No. 2 | | No. 3 | | No. 4 | | No. 5 | |
|---|---|---|---|---|---|---|---|---|---|---|---|
| | | Flow rate (L/min) | | | | | | | | | |
| | | 10 | | 20 | | 30 | | 40 | | 50 | |
| | | Example | Experimental Example | Example | Experimental Example | Example | Experimental Example | Example | Experimental Example | Example | Experimental Example 1 |
| Flow velocity (m/s) | | 0.13 | 0.13 | 0.27 | 0.27 | 0.40 | 0.40 | 0.53 | 0.53 | 0.66 | 0.66 |
| Grouting amount | Expansive polymer grouting material/g | 150 | 150 | 250 | 250 | 300 | 300 / 350 | 450 | 450 / 505 | 500 | 500 / 565 |
| | Mass of carrying fluid/g | 225 | 225 | 375 | 375 | 450 | 450 / 450 | 675 | 675 / 675 | 750 | 750 / 750 |
| Whether the blocking is successful | | Yes | Yes | Yes | Yes | Yes | No / Yes | Yes | No / Yes | Yes | No / Yes |
| Blocking length (m) | | 6.7 | 8.0 | 8.5 | 9.2 | 9.3 | 11.1 | 11.2 | 13.0 | 12.8 | 15.1 |

It can be seen from Tables 1-5 that under the condition of the flow rate of 10 L/min, only 150 g of the expansive polymer grouting material prepared in Examples 1-5 can successfully block the water inrush under the action of 225 g of carrying fluid. During the experiment, the hydraulic pressure of the water supply system is adjusted to provide different flow velocities and flow rates of water flow. As the flow rate of the water flow increases, the gushing water can be effectively blocked by adjusting the injection amount of the polymer water-absorbent resin, and the blocking effect is significant. When the water flow is adjusted to the high-pressure large-flow-rate water inrush condition at a flow rate of 50 L/min, the water inrush can be successfully blocked by 500 g of polymer water-absorbent resin under the action of 750 g of carrying fluid, indicating that the expansive polymer grouting material prepared in the present invention has excellent water inrush blocking effect. Under the condition that the amount of the grouting material prepared in the experimental examples is the same as that in the examples, when the flow rate and flow velocity of the gushing water are low, blocking can still be realized, but the blocking length is significantly higher than that in the example, because the grouting material prepared in the experimental examples cannot quickly expand due to low water absorption rate and needs to flow with water for a longer time. When the water flow is adjusted to the high-pressure large-flow-rate water inrush condition at a flow rate of 30 L/min or above, the grouting material prepared by the experimental examples cannot realize effective blocking. The effective blocking can be realized only after increasing the amount of the grouting material, and the blocking length is generally higher than that in the examples. This is because the grouting material prepared in the experimental examples cannot realize quick expansion and blocking in high-pressure large-flow-rate water inrush due to low water absorption rate and expansion rate, but is washed away by the water flow to form a linear distribution, and the grouting material in this form of distribution still cannot realize effective blocking even it expands later.

The above descriptions are merely preferred embodiments of this application and are not intended to limit this application. For those skilled in the art, this application may have various modifications and changes. Any modification, equivalent replacement, and improvement made without departing from the scope and the principle of this application shall fall within the protection scope of this application.

What is claimed is:

1. A preparation method of an expansive polymer grouting material for treating high-pressure large-flow-rate karst water inrush, comprising the following steps:
   (1) adding a crosslinking agent to acrylic acid; then adding a polymer water-absorbent resin comonomer and performing a polymerization reaction to obtain a precursor;
   (2) adding an initiator to the precursor of step (1), heating the mixture, performing a reaction to obtain a hydrogel, and grinding the hydrogel to obtain a primary polymer water-absorbent resin;
   (3) spraying a surface crosslinking agent onto a surface of the primary polymer water-absorbent resin of step (2), and drying the obtained product for later use; and
   (4) preparing a suspension from an inorganic water conducting agent, spraying the suspension onto the dried product of step (3), and performing drying to obtain the expansive polymer grouting material;

wherein the polymer water-absorbent resin comonomer comprises polyvinyl alcohol, acrylamide, methacrylamide or acrylonitrile;
   the crosslinking agent comprises one or a combination of more of N,N-methylenebisacrylamide, dipentaerythritol hexaacrylate, pentaerythritol tetraester, pentaerythritol triallyl ether, pentaerythritol triacrylate, polyethylene glycol diglycidyl ether, ethoxylated glycerol triacrylate and ethylene glycol dimethacrylate;
   the surface crosslinking agent comprises one or a combination of more of water, polylol, glycidyl ether, ethylene carbonate, propylene carbonate and a polyvalent metal compound; and
   the inorganic water conducting agent comprises fumed silica, nano titania or activated alumina powder.

2. A preparation method of an expansive polymer grouting material for treating high-pressure large-flow-rate karst water inrush, wherein in the preparation method according to claim 1, when a precursor is prepared in step (1), firstly, acrylic acid is incompletely neutralized with lye to obtain an incompletely neutralized solution containing acrylic acid, then the incompletely neutralized solution and a crosslinking agent are mixed and subjected to a polymerization reaction with a polymer water-absorbent resin comonomer to obtain the precursor, and the subsequent steps are the same as steps (2)-(4) in the preparation method according to claim 1.

3. The preparation method according to claim 2, wherein a degree of neutralization of the incompletely neutralized solution is maintained at 40%-90%.

4. The preparation method according to claim 2, wherein the lye comprises sodium hydroxide, calcium hydroxide or a mixture of both.

5. The preparation method according to claim 2, wherein a mass concentration of the lye is 20-50%.

6. The preparation method according to claim 1, wherein in step (1), a mass concentration of the acrylic acid is 25-45%.

7. The preparation method according to claim 6, wherein in step (1), the polymer water-absorbent resin comonomer is added in a proportion of 0.5-20% by mass of the acrylic acid in step (1).

8. The preparation method according to claim 6, wherein in step (1), the crosslinking agent is added in a proportion of 0.5-2% by mass of the acrylic acid in step (1).

9. The preparation method according to claim 6, wherein in step (2), the initiator is added in a proportion of 0.1-0.7% by mass of the acrylic acid in step (1).

10. The preparation method according to claim 6, wherein in step (3), the surface crosslinking agent is added in a proportion of 3-6% by mass of the primary polymer water-absorbent resin in step (2).

11. The preparation method according to claim 6, wherein in step (4), the inorganic water conducting agent is added in a proportion of 0.5-1.5% by mass of the primary polymer water-absorbent resin.

12. The preparation method according to claim 1, wherein in step (2), the initiator comprises: an inorganic peroxide initiator, an azo initiator and redox initiators.

13. The preparation method according to claim 12, wherein the inorganic peroxide initiator comprises potassium persulfate, sodium persulfate and ammonium persulfate;
   the azo initiator comprises azobisisobutyronitrile, azobisisoheptonitrile and dimethyl azobisisobutyrate; and
   the redox initiators comprise ammonium persulfate/sodium bisulfite, hydrogen peroxide/ferrous sulfate, ammonium persulfate/ferrous sulfate and potassium persulfate/ferrous chloride; wherein the substance before "/" indicates an oxidation initiator, the substance after "/" indicates a reduction initiator, and each couple of redox initiators are used at the same time; and a mass ratio of the oxidation initiator to the reduction initiator is 1:3-8.

14. The preparation method according to claim 1, wherein the polyol comprises ethylene glycol, propylene glycol or glycerol; and the polyvalent metal compound comprises silver nitrate and cupric chloride.

15. The preparation method according to claim 1, wherein in step (2), the heating means: gradually increasing a reaction temperature from 0 to 85° C., and the initiator is a combination of an inorganic peroxide initiator, an azo initiator and redox initiators.

16. The preparation method according to claim 15, wherein a mass ratio of the inorganic peroxide initiator to the azo initiator to the redox initiators is 1-2:1-2:1-7.

17. The preparation method according to claim 1, wherein in step (1), the time of the polymerization reaction is 1-1.5 h; and in steps (3) and (4), the drying conditions are: aeration-drying at 100-120° C. for 20-60 min.

18. An expansive polymer grouting material prepared by the method according to claim 1, wherein the grouting material has a core-shell structure, wherein the primary polymer water-absorbent resin obtained in step (2) is a core, and the surface crosslinking agent and the water conducting agent respectively added in step (3) and step (4) are a shell.

19. An expansive polymer grouting material composition, wherein the composition is composed of an expansive polymer grouting material and a carrying fluid; and the expansive polymer grouting material is the expansive polymer grouting material obtained by the preparation method according to claim 1.

20. The composition according to claim 19, wherein the carrying fluid comprises one or both of glycerol and ethanol.

21. The composition according to claim 19, wherein a mass ratio of the expansive polymer grouting material to the carrying fluid is 1-2:1-5.

* * * * *